Figure 3:
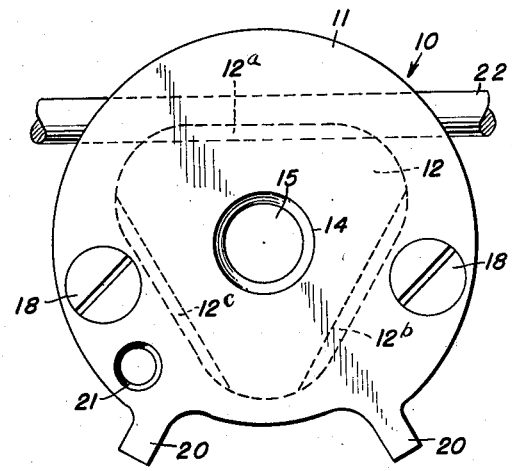

Aug. 12, 1958   J. F. DRUMMEY   2,847,521
MULTIPLE CONTACT CURRENT COLLECTOR
Filed May 4, 1955   2 Sheets-Sheet 1
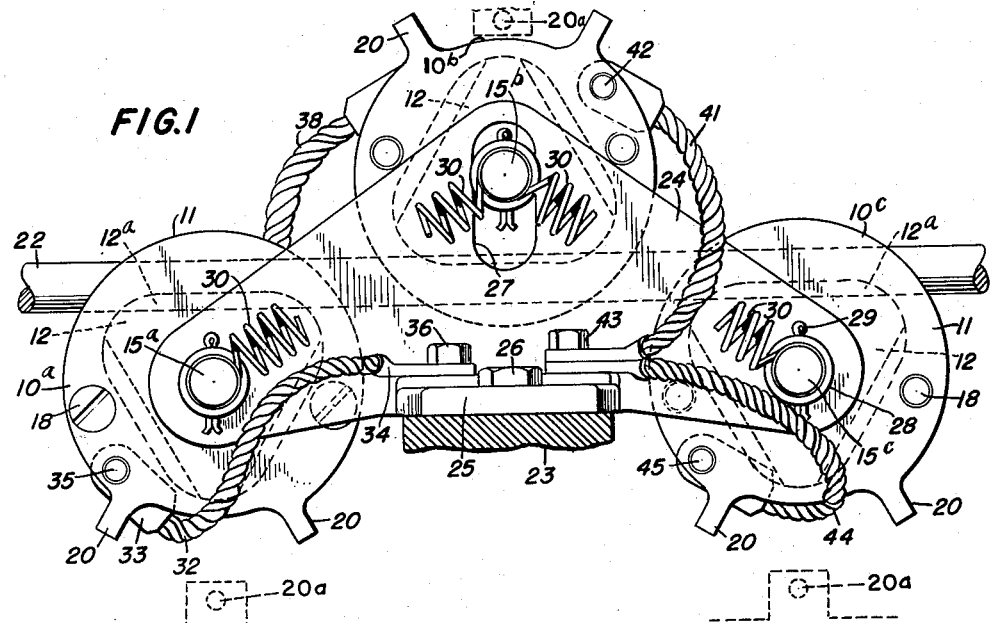
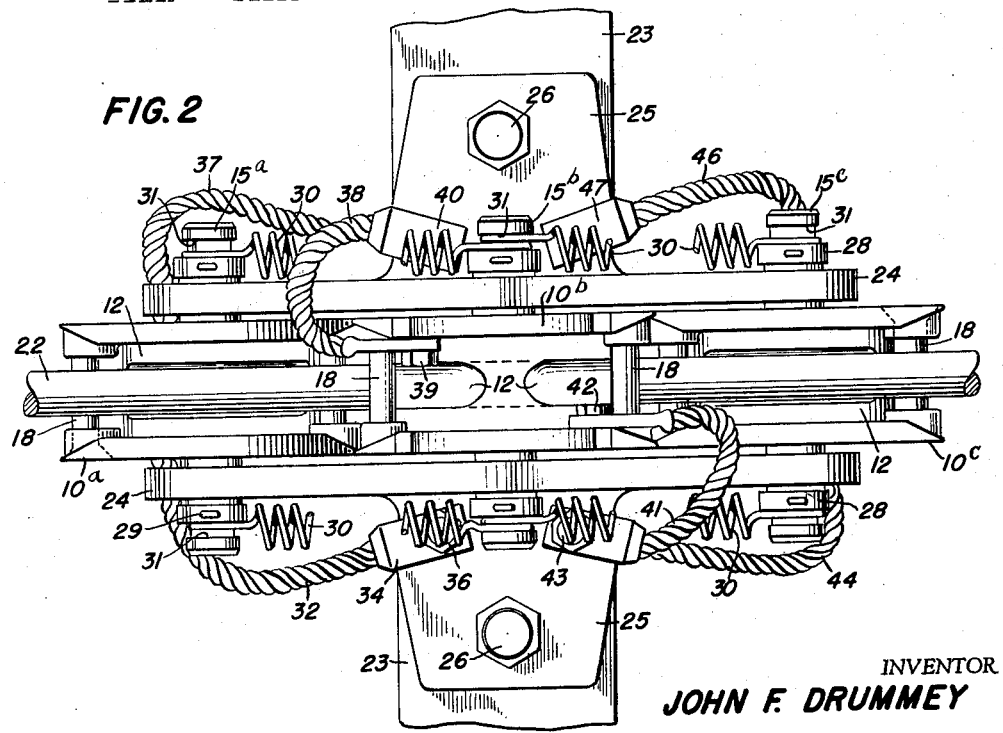
INVENTOR
JOHN F. DRUMMEY
BY
ATTORNEY Aug. 12, 1958     J. F. DRUMMEY     2,847,521
MULTIPLE CONTACT CURRENT COLLECTOR Filed May 4, 1955     2 Sheets-Sheet 2

INVENTOR
JOHN F. DRUMMEY

BY

ATTORNEY

2,847,521
MULTIPLE CONTACT CURRENT COLLECTOR

John F. Drummey, Manhasset, N. Y., assignor to Morganite Incorporated, Long Island City, N. Y., a corporation of New York Application May 4, 1955, Serial No. 505,865

5 Claims. (Cl. 191—58)

This invention relates to current collectors and consists more particularly in new and useful improvements in a multiple contact, positive pressure current collector adapted for use in connection with electrically driven cranes, trucks and similar industrial equipment which is energized through an overhead electric trolley wire.

Various forms of current collectors have been used in this field, including assemblies wherein grooved carbon inserts are permanently mounted between two metal side plates by means of a bushing which passes through centrally aligned holes and is spun over at each end. The side plates serve to guide the trolley wire, should it tend to leave the carbon insert. However, with these known devices overheating, uneven and rapid wear, caused by insufficient pressure, particularly when heavy current is carried, has been a major disadvantage.

An object of the present invention is to provide a current collector assembly wherein preferably three collector units comprising grooved carbon inserts, respectively retained between two side plates, are mounted in alternately opposed relation in a bracket member, spring means being provided for urging the inserts of opposed units into contact with a trolley wire running therebetween.

Another object is to provide an assembly of this type wherein the individual collector units are mounted for limited rotation in the bracket, to facilitate proper alignment of the insert with the trolley wire.

A further object of the invention is to provide in such current collector assemblies, collector units having substantially triangular or multifaced carbon inserts with wire engaging grooves extending longitudinally on their respective faces, said inserts being rotatably adjustable so that successive contact faces may be presented to the trolley wire.

Still another object of the invention is to provide in an assembly of this character, collector units wherein the carbon inserts are replaceable so that the retaining side plates may be used indefinitely.

A still further object of the invention is to provide in an assembly such as here involved, means for the attachment of shunts to the side plates of the units, to obviate the risk of burning the mounting spindle and center hole of the collector due to passage of current.

With the above and other objects in view which will appear as the description proceeds, the invention consists in the novel features herein set forth, illustrated in the accompanying drawings and more particularly pointed out in the appended claims.

Figure 4:
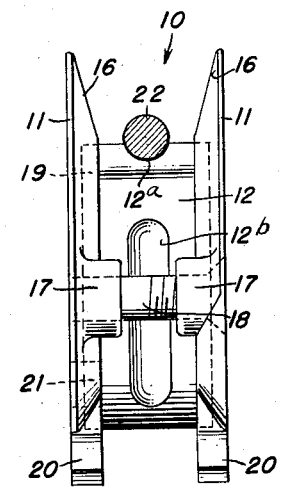
Figure 5:
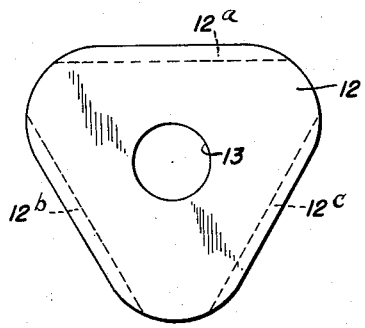
Figure 6:
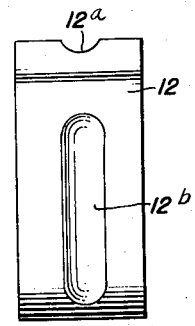

Referring to the drawings in which numerals of like character designate similar parts throughout the several views, Figure 1 is a view in side elevation showing the collector units of the assembly in engagement with an electric trolley wire, Figure 2 is a top plan view of the same, Figure 3 is an enlarged side elevational view of one of the collector units removed from its mounting bracket and showing the relative position of one of the contact faces with respect to the trolley wire, Figure 4 is a view taken at right angles to Figure 3, Figure 5 is a side elevational detail of one of the carbon inserts and, Figure 6 is a view taken at right angles to Figure 5, showing the wire engaging grooves in the sides of the insert.

In the drawings, referring first to Figures 3 to 6, the individual current collector units are generally represented by the numeral 10 and each consists of a pair of opposed side plates 11 adapted to embrace a carbon insert 12. As seen in Figure 5, each of the carbon inserts 12 is substantially triangular in plan profile, its three sides being of equal length and provided with trolley wire contacting grooves 12a, 12b and 12c, running longitudinally in the center of respective sides. The three corners of the triangle are preferably rounded as shown. It will, of course, be understood that while I have shown these inserts as triangular in shape, they may be of any suitable multi-faced contour, with wire engaging grooves on respective contact faces.

The central portion of the insert 12 is provided with a transverse hole 13 which registers with aligned, complementary holes 14 in the central portions of opposed side plates 11, to receive a transverse mounting pin assembly 15 hereinafter referred to. As seen in Figure 4, the side plates 11, extend radially beyond the extremities of the carbon insert 12 to provide guide flanges 16, the opposed inner faces of which are preferably beveled and converge toward the axis of the side plates. The inner faces of the flanges 16 on either side of the unit are provided with opposed bosses 17 which are drilled and internally threaded to receive retaining screws 18 by means of which the outer parallel sides of the carbon insert 12 are maintained in close contact with the opposed inner faces of respective side plates 11. In order to prevent relative rotation of the insert 12 with respect to the side plates 11, the opposed flat faces of the side plates may be recessed as shown in dotted lines at 19, to receive the outer extremities of the insert. These recesses 19 are preferably of a contour coinciding substantially with the plan profile of the insert.

On one edge of its periphery, each side plate 11 is provided with a pair of radially projecting lugs 20, adapted to engage stop pins 20a shown in dotted lines in Fig. 1, which may be mounted at a suitable point on a crane frame or the like, to limit rotation of the unit about the axis of the mounting pin assembly 15. A threaded opening 21 is provided in each side plate of each unit to receive a suitable screw for securing one end of a shunt when the device is assembled, as will later appear.

It will be apparent that with a collector unit such as just described, either of the grooves 12a, 12b or 12c on the respective contact faces of the insert 12 may be employed for engagement with the trolley wire or conductor 22 and when a selected groove has become worn, the insert 12 is adjusted about its axis to present a new contact face to the wire. This is accomplished by removing the screws 18, separating the side plates 11, shifting the position of the insert within the recess 19 and replacing the screws 18.

Turning now to Figures 1 and 2, the preferred embodiment of the multiple contact, positive pressure current collector assembly is shown for purposes of illustration, as mounted on the top of the metallic frame 23 of an industrial crane or the like. The mounting bracket for the assembly consists of two transversely-spaced side plates 24, each of which is provided with an outwardly projecting, right angular base member 25, drilled to receive a mounting bolt or screw 26 by means of which the respective side plates 24 are firmly secured to the crane frame 23. The bracket side plates and their respective angular bases may be integrally formed of any suitable metal having the required conductive properties and the rigidity to support the assembly.

The opposed bracket side plates 24 are drilled transversely adjacent their lower longitudinal extremities to provide aligned holes adapted to receive the mounting pin assemblies 15a and 15c of two collector units 10a and 10c. These collector units are constructed and assembled in the manner previously described and illustrated in Figures 3 and 4 and their carbon inserts 12 are adjusted so that their contact grooves 12a are disposed for electrical engagement with the underside of the trolley wire 22. Adjacent the apex of the triangular bracket assembly, the plates 24 are provided with a pair of registering, vertically disposed slots 27, adapted to receive the mounting pin 15b of a third collector unit 10b which is mounted in reversed relation with respect to units 10a and 10c so that its contact groove 12a rides on the upper side of the trolley wire 22 at a point between the corresponding contact grooves of units 10a and 10c. In other words, the three collector units are arranged in alternately opposed relation for electrical contact with the trolley wire 22.

The pins 15a, 15b and 15c extend through aligned openings 13 and 14 in the carbon inserts 12 and collector unit side plates 11 respectively, with their opposite extremities projecting beyond the respective bracket side plates 24 as best seen in Figure 2, so that the individual collector units are capable of limited rotation about their axes, to facilitate alignment of the inserts for proper electrical contact with the trolley wire 22. The projecting ends of the respective mounting pins 15a—15c are secured in place by means of annular collars 28 and cotter pins 29 which extend through suitable holes in the mounting pins.

As previously stated, the mounting pin 15b for the uppermost collector unit 10b is retained in a vertical slot 27 which permits a limited vertical adjustment of the position of the collector unit 10b with respect to the lowermost units 10a and 10c. As shown in Figure 1, a pair of coil springs 30 are respectively connected between the projecting ends of mounting pins 15a and 15b and between pins 15b and 15c, on opposite outer sides of the opposed bracket side plates 24. The opposite extremities of the springs 30 are preferably looped, and engage annular recesses 31 in the respective mounting pins and when installed, the springs are expanded so as to normally exert a contracting tension on the mounting pin 15b of the upper collector unit 10b, urging said pin downwardly in its vertical slot 27. Thus, the interconnecting springs cause a constant, positive contact pressure to be exerted on each of the collector units with the trolley wire 22 interposed between the upper unit 10b and the two lower units 10a and 10c.

Each of the three collector units 10a, 10b and 10c is electrically connected to the upper portion of the metallic crane frame 23 through the base members 25 of the bracket assembly 24 and a series of suitable shunts. Starting with collector unit 10a, a shunt 32, having connecting lugs 33 and 34 at opposite ends, is connected between one side plate 11 of said unit and the base member 25 by screws 35 and 36, engaging the lugs 33 and 34 respectively. The opposite side plate of the collector unit 10a is similarly connected to the opposite base member 25 by a second shunt 37 (Figure 2). The upper collector unit 10b is connected by a shunt 38 which extends from a connecting screw 39 in the side plate 11 of the unit, to the base member 25 where it is jointly secured with the adjacent terminal of shunt 37 by a screw 40. The opposite side of the unit 10b is connected by shunt 41, secured by screw 42 to the side plate of the unit and screw 43, to the respective base member 25. On this same side of the assembly, a shunt 44 is connected at 45 to the side plate of collector unit 10c with its opposite end jointly connected to the base member 25 through the medium of the screw 43, just referred to. Finally, the opposite side of the unit 10c is connected by a shunt 46, one end of which is secured by screw 47 to the base member 25 with its opposite end secured to the side plate 11 of unit 10c in a manner similar to the connections heretofore referred to.

Although for purposes of illustration, I have shown and described double shunting, single shunting may be acceptable in some installations and it should be noted that the present invention includes any suitable means for electrically connecting the respective units.

As before stated, the present invention is primarily designed for use as a current collecting assembly for industrial equipment, such as cranes, etc., which derive their current from an overhead trolley wire 22 which may be supported by any suitable means (not shown). It will be apparent that with the device just described, as the collector assembly travels along the wire 22, the alternately opposed collector units automatically adjust themselves with respect to the wire so as to facilitate proper engagement of their contact grooves and the constant restricting tension of the springs 30 assures a positive pressure at all times. This proper alignment and positive pressure are extremely important factors particularly where heavy currents are involved as inadequate contact pressure gives rise to overheating and the resultant deterioration of the unit.

With an assembly constructed in accordance with this invention, greater life is obtained through the increase of the usable carbon, made available by the rotatable mounting of the multi-faced inserts. Furthermore, the simplicity of this assembly and its various components, greatly reduces the shutdown time when adjustments and replacements are required.

It is also to be noted that the provision of substantial side plates for the collector units not only facilitates the attachment of the shunts to the side plates to obviate the risk of burning of the mounting spindles and the center hole, due to passage of current, but provides for better head dissipation.

In the preceding description, it has been assumed that the crane frame 23 acts as a conductor leading from the collector assembly to the crane motor. However, in some installations it may be desirable to employ a collector support of insulating material with auxiliary means for conduction of current. Thus, in the appended claims, the term "current collecting support" is intended to embrace either or both of these arrangements.

From the foregoing it is believed that the invention may be readily understood by those skilled in the art without further description, it being borne in mind that numerous changes may be made in the details disclosed without departing from the spirit of the invention as set forth in the following claims.

What I claim is:

1. In a multiple contact current collector assembly including a mounting bracket, means for fixing said bracket on a current conducting support, collector units, carried by said bracket, each comprising a pair of opposed side plates, a multi-sided current collecting insert mounted coaxially between and spacing said side plates, the edges of said side plates projecting radially beyond the boundaries of said insert to provide opposed guide flanges for a trolley wire, a contact groove in each side of said insert, means detachably connecting said side plates together over said insert, to permit the adjustment of said insert about its axis, whereby successive contact grooves may be presented for engagement with said trolley wire, and means for connecting a shunt to at least one side plate of each unit, and shunts electrically connecting at least one of each pair of side plates to said current conducting support.

2. A multiple contact current collector comprising a mounting bracket consisting of a pair of transversely spaced parallel side plates fixed on a current conducting support, two longitudinally spaced end collector units respectively mounted in said bracket for limited rotations on transverse pins extending between fixed points at opposite ends of said side plates, a third collector unit mounted above and intermediate said end units, on a transverse pin supported for vertical sliding movement in opposed slots in said side plates, current collecting inserts carried by said units and respectively arranged for sliding electrical contact with alternately opposed sides of a trolley wire extending between said third unit and end units, means independent of said bracket, electrically connecting respective units to said support, and spring means normally urging the axis of said third unit toward the horizontal plane through the axes of said end units.

3. A multiple, sliding contact current collector comprising a rigid mounting bracket having transversely spaced, parallel side walls and including means for mounting the same on a current conducting support, two end collector units respectively mounted for limited rotation between said side walls at opposite ends of the latter, on longitudinally spaced, fixed axes, a third collector unit mounted for limited rotation between said side walls, above and intermediate said end units, means associated with said plates, providing a vertically shiftable axis for said third unit, current collecting inserts fixed in respective units for corresponding limited rotation therewith, respective inserts having straight, elongated grooves in their contact faces for sliding electrical contact with alternately opposed sides of a trolley wire extending between said third unit and end units, spring means normally urging said third unit and its shiftable axis toward the horizontal plane through the fixed axes of said end units, and means independent of said bracket, electrically connecting respective collector units to said support.

4. A current collector as claimed in claim 3, wherein each of said collector units comprises a pair of opposed side plates, multisided current collecting inserts mounted coaxially between respective pairs of side plates, a contact groove in each side of said inserts, means permitting adjustment of said inserts about their axes, whereby successive contact grooves may be presented for engagement with said trolley wire, and means for locking said inserts in a selected adjustment.

5. A current collector as claimed in claim 4, including shunts for electrically connecting at least one of each pair of side plates to said support, whereby said collector units are electrically connected to said support, independently of said bracket.

References Cited in the file of this patent

UNITED STATES PATENTS

| | | |
|---|---|---|
| 566,984 | Hunter | Sept. 1, 1896 |
| 716,376 | Bader | Dec. 23, 1902 |
| 884,630 | Bauer | Apr. 14, 1908 |
| 970,865 | Weber | Sept. 20, 1910 |
| 1,570,805 | Wallet | Jan. 26, 1926 |
| 1,589,160 | Henry et al. | June 15, 1926 |

FOREIGN PATENTS

| | | |
|---|---|---|
| 512,046 | France | Jan. 13, 1921 |
| 16,521 of 1895 | Great Britain | Aug. 8, 1896 |